(12) United States Patent
Brown et al.

(10) Patent No.: US 8,407,468 B2
(45) Date of Patent: *Mar. 26, 2013

(54) SYSTEM AND METHOD FOR AUTHENTICATING STREAMED DATA

(75) Inventors: Michael Kenneth Brown, Fergus (CA); David Francis Tapuska, Waterloo (CA); Michael Stephen Brown, Kitchener (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/299,520

(22) Filed: Nov. 18, 2011

(65) Prior Publication Data

US 2012/0124371 A1    May 17, 2012

Related U.S. Application Data

(63) Continuation of application No. 11/202,081, filed on Aug. 12, 2005, now Pat. No. 8,078,867.

(51) Int. Cl.
*H04L 29/06* (2006.01)

(52) U.S. Cl. .......................... 713/161; 713/181

(58) Field of Classification Search .................. 713/150, 713/160, 161, 168; 380/210; 726/26, 27, 726/30

See application file for complete search history.

(56) References Cited

U.S. PATENT DOCUMENTS

| | | | |
|---|---|---|---|
| 5,844,888 A | 12/1998 | Markkula et al. | |
| 6,393,566 B1 | 5/2002 | Levine | |
| 2003/0009694 A1 | 1/2003 | Wenocur et al. | |
| 2004/0193876 A1 | 9/2004 | Donley et al. | |
| 2005/0108518 A1 | 5/2005 | Pandya | |
| 2006/0018481 A1 | 1/2006 | Nagano et al. | |
| 2006/0026433 A1 | 2/2006 | Montenegro | |
| 2006/0136728 A1 | 6/2006 | Gentry et al. | |
| 2007/0038855 A1 | 2/2007 | Brown | |
| 2008/0133929 A1 | 6/2008 | Gehrmann et al. | |

FOREIGN PATENT DOCUMENTS

| | | |
|---|---|---|
| CA | 2549919 | 12/2007 |
| CA | 2549919 C | 10/2011 |
| EP | 1755270 | 2/2007 |
| EP | 2276195 | 1/2011 |

OTHER PUBLICATIONS

Notice of Allowance. Canadian Patent Application No. 2,549,919. Dated: Feb. 17, 2011.
European Search and Examination Report. Application No. 10185076.6. Dated: Dec. 14, 2010.

(Continued)

*Primary Examiner* — Gilberto Barron, Jr.
*Assistant Examiner* — Abdulhakim Nobahar
(74) *Attorney, Agent, or Firm* — Bereskin & Parr LLP/S.E.N.C.R.L., s.r.l.

(57) ABSTRACT

One embodiment of a method of authenticating data comprises: receiving, at a device, data in a plurality of indexed packets transmitted by a data server, the data of the indexed packets being at least a portion of a larger data stream; receiving, at the device, from a data authentication server connected to the device by a network, a server-computed authentication value based on a subset of the data transmitted by the data server, the data authentication server having access to the data that was transmitted from the data server to the device; and comparing a device-computed authentication value based on a subset of the received data, corresponding to the subset of the data transmitted by the data server, with the server-computed authentication value in order to determine whether the subset of the data received at the device is authentic.

27 Claims, 6 Drawing Sheets

OTHER PUBLICATIONS

European Examination Report. Application No. 05107456.5. Dated: Jun. 4, 2010.
European Examination Report. Application No. 05107456.5. Dated: Oct. 17, 2007.
European Search Report. Application No. 05107456.5. Dated: Nov. 7, 2005.
Wong, C.K. et al. "Digital Signatures for Flows and Multicasts". IEEE/ACM Transactions on Networking, IEEE Inc. New York, US, vol. 7, No. 4, Aug. 4, 1999, pp. 502-513, XP000848695.
Torben, Pederson "Signature Server" Onlline! Jan. 2001 XP 002215192. Retrieved from the Internet: URL:www.cryptomathic. com—retrieved on Oct. 27, 2005.
Park, Jung Min, "Efficient multicast stream authentication using erasure codes", http://portal.acm.org/citation.cfm?id=762480.
Wu, Yongdong, "Efficient Object-Based Stream Authentication", http://www.i2r.a-star.edu.sg/icsd/staff/madi/papers/indocryt2002. pdf.
Amendment. U.S. Appl. No. 11/202,081. Dated: Jul. 13, 2011.
Amendment. U.S. Appl. No. 11/202,081. Dated: Sep. 13, 2010.
Amendment. U.S. Appl. No. 11/202,081. Dated: Apr. 15, 2011.
Amendment. U.S. Appl. No. 11/202,081. Dated: Nov. 23, 2010.
Amendment. U.S. Appl. No. 11/202,081. Dated: Mar. 30, 2010.
Final Office Action. U.S. Appl. No. 11/202,081. Dated: Jun. 14, 2010.
Final Office Action. U.S. Appl. No. 11/202,081. Dated: Feb. 16, 2011.
Notice of Allowance. U.S. Appl. No. 11/202,081. Dated: Aug. 11, 2011.
Office Action. U.S. Appl. No. 11/202,081. Dated: Oct. 1, 2010.
Office Action. U.S. Appl. No. 11/202,081. Dated: May 16, 2011.
Office Action. U.S. Appl. No. 11/202,081. Dated: Dec. 30, 2009.
Interview Summary. U.S. Appl. No. 11/202,081. Dated Sep. 24, 2010.
Response. European Patent Application No. 05107456.5. Dated: Feb. 7, 2006.
Response. European Patent Application No. 05107456.5. Dated: Apr. 25, 2008.
Response. European Patent Application No. 05107456.5. Dated: Oct. 28, 2008.
Response. European Patent Application No. 05107456.5. Dated: Jul. 28, 2010.
Response. European Patent Application No. 10185076.6. Dated: Feb. 14, 2011.
Communication under Rule 71(3) EPC. European Patent Application No. 10185076.6. Dated: Dec. 6, 2011.
Decision to grant a European patent pursuant to Article 97(1) EPC. European Patent Application No. 10185076.6. Dated: May 10, 2012.
Office Action. Canadian Patent Application No. 2,549,919. Dated: Feb. 16, 2010.
Office Action. Canadian Patent Application No. 2,549,919. Dated: Jul. 7, 2010.
Communication under Rule 71(3) EPC. European Application No. 05107456.5. Dated: Dec. 10, 2012.

FIG. 6

SYSTEM AND METHOD FOR AUTHENTICATING STREAMED DATA

CROSS-REFERENCE TO RELATED APPLICATIONS

This application is a continuation of U.S. patent application Ser. No. 11/202,081, filed Aug. 12, 2005, now issued to patent as U.S. Pat. No. 8,078,867, the entire contents of which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention relate generally to the transmission of data to devices, such as mobile devices for example, and more specifically to a system and method for authenticating data transmitted to such devices.

BACKGROUND OF THE INVENTION

Mobile devices typically provide a number of different modes of communication. For example, a mobile device may be used to send and receive both voice and data communications. More specifically, with regards to data communications, a mobile device may allow different types of messages to be sent and received, including electronic mail messages, text messages, and personal identification number (PIN) messages, for example. Furthermore, many mobile devices are also adapted to receive multimedia content, which may include audio, video, web pages, and other information, some of which may be obtained from the Internet.

A file containing multimedia content may be transmitted to a mobile device such that it is first received at the mobile device in its entirety, before the data in the file is processed and delivered to a user. For example, a video file may be transmitted to a mobile device such that the mobile device first receives it in its entirety, before the user is able to view the video. In an alternative method of data delivery, data associated with multimedia content may be sent to a mobile device, where it is processed as it is received, through a method known generally as "streaming". A stream is a potentially very long sequence of data bits that is split into individual packets for delivery. This method may be appropriate where the destination device has insufficient memory to buffer the whole stream, or where there is a desire to consume the data in real-time.

Data integrity is an important issue in data streaming applications. Authentication solutions are directed to ensuring that a recipient of the streamed data can determine if the data that has been received is authentic; in particular, that the data has not been corrupted or otherwise modified during transport. At least one example of a known authentication solution involves appending a signature or message authentication code (MAC) to each packet. This known solution, however, introduces significant overhead to the data transmission. Such overhead may be particularly unacceptable when the data is to be transmitted to mobile devices, due to the high costs associated with the increased bandwidth.

BRIEF DESCRIPTION OF THE DRAWINGS

For a better understanding of embodiments of the systems and methods described herein, and to show more clearly how they may be carried into effect, reference will now be made, by way of example, to the accompanying drawings in which.

DETAILED DESCRIPTION

Embodiments of the systems and methods described herein are generally directed to a technique for facilitating the authentication of streamed data received at a device in which authentication information is not distributed over the data stream. In at least one embodiment, information required to authenticate a particular subset of the data already received at a device is requested from a server.

In one broad aspect, there is provided a method of authenticating data streamed as indexed data packets to a device, in which authentication data is not distributed over the packets, the method comprising the steps of: receiving, at the device, data in a plurality of packets transmitted by a data server; submitting a request for a server-computed authentication value to a data authentication server, wherein the data authentication server is adapted to compute the server-computed authentication value based on a subset of the data transmitted by the data server; receiving, at the device, the server-computed authentication value from the data authentication server in response to the request; computing a device-computed authentication value based on a subset of the data received at the device corresponding to the subset of the data transmitted by the data server; and determining if the subset of the data received at the device is authentic by comparing the server-computed and device-computed authentication values.

In another broad aspect, the data authentication server is adapted to compute the server-computed authentication value by applying an authentication value generating function, such as a hash function for example, to the subset of the data transmitted by the data server, and wherein the device-computed authentication value is computed by applying the same authentication value generating function to the subset of the data received at the device corresponding to the subset of the data transmitted by the data server.

In another broad aspect, the request submitted to the data authentication server may comprise an end index that defines both the subset of the data transmitted by the data server on which the server-computed authentication value is based and the subset of the data received by the device on which the device-computed authentication value is based. The end index may be associated with the last non-truncated packet of data received at the device, for example.

In another broad aspect, the data authentication server may be adapted to sign the server-computed authentication value computed thereby, wherein the signature of the server-computed authentication value is to be verified by the device.

These and other aspects and features of various embodiments will be described in greater detail below.

Some embodiments of the invention may make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
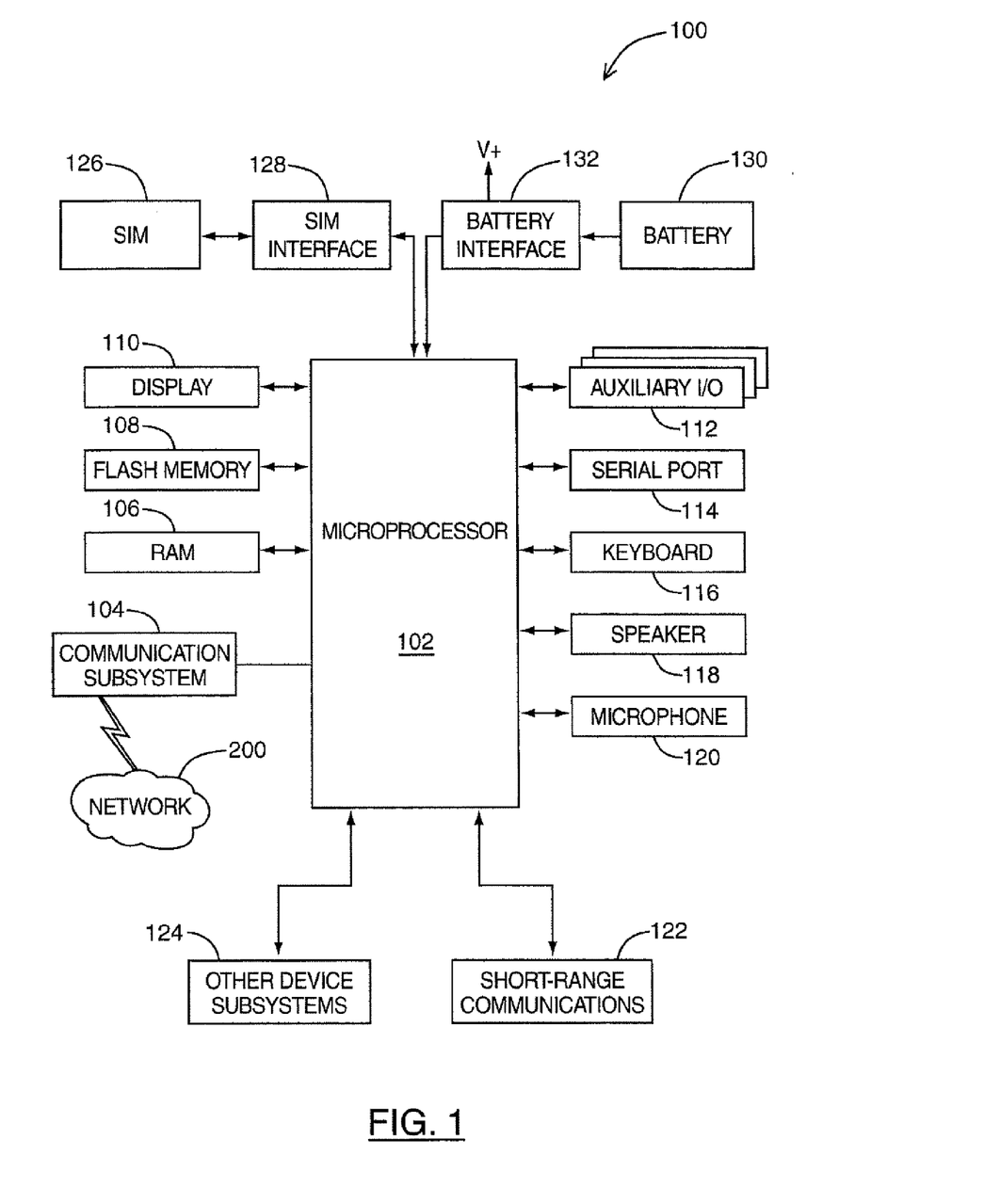
FIG. 1 is a block diagram of a mobile device in one example implementation.
Figure 2:
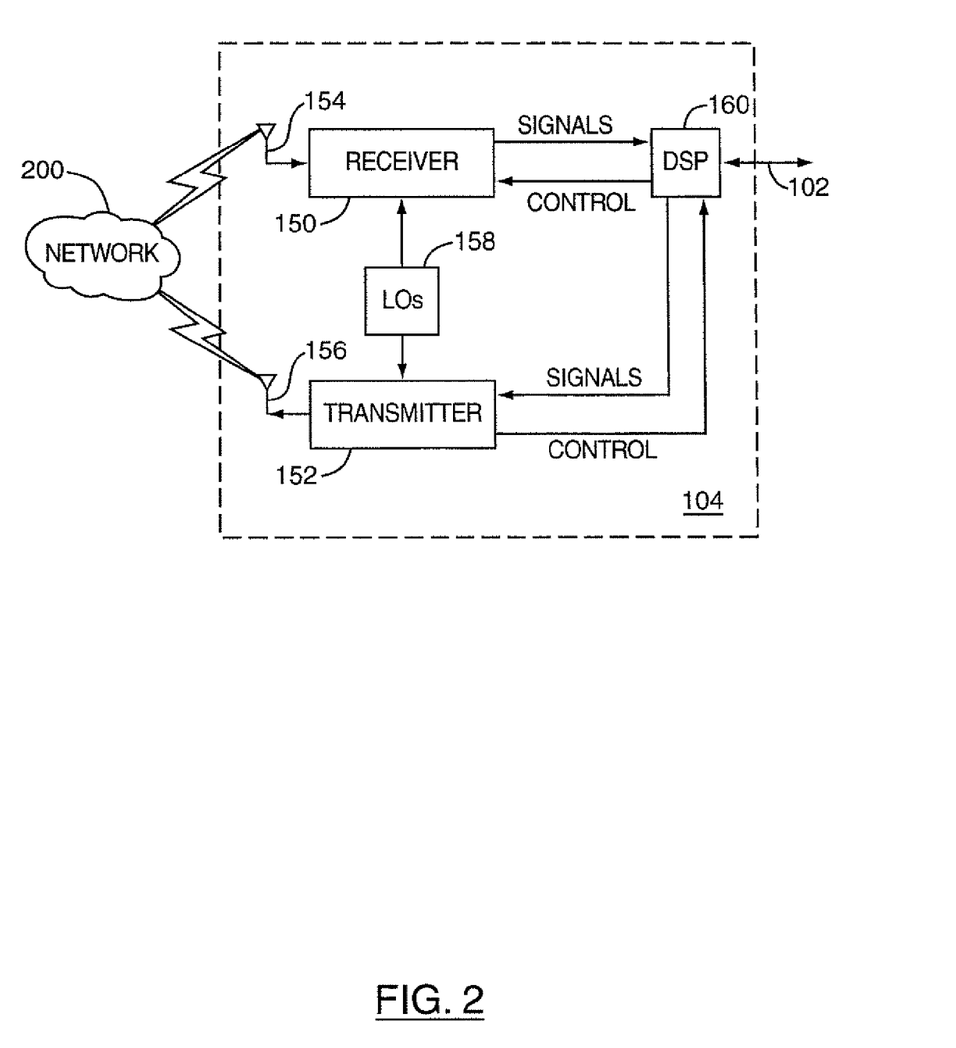
FIG. 2 is a block diagram of a communication subsystem component of the mobile device of FIG. 1.
Figure 3:
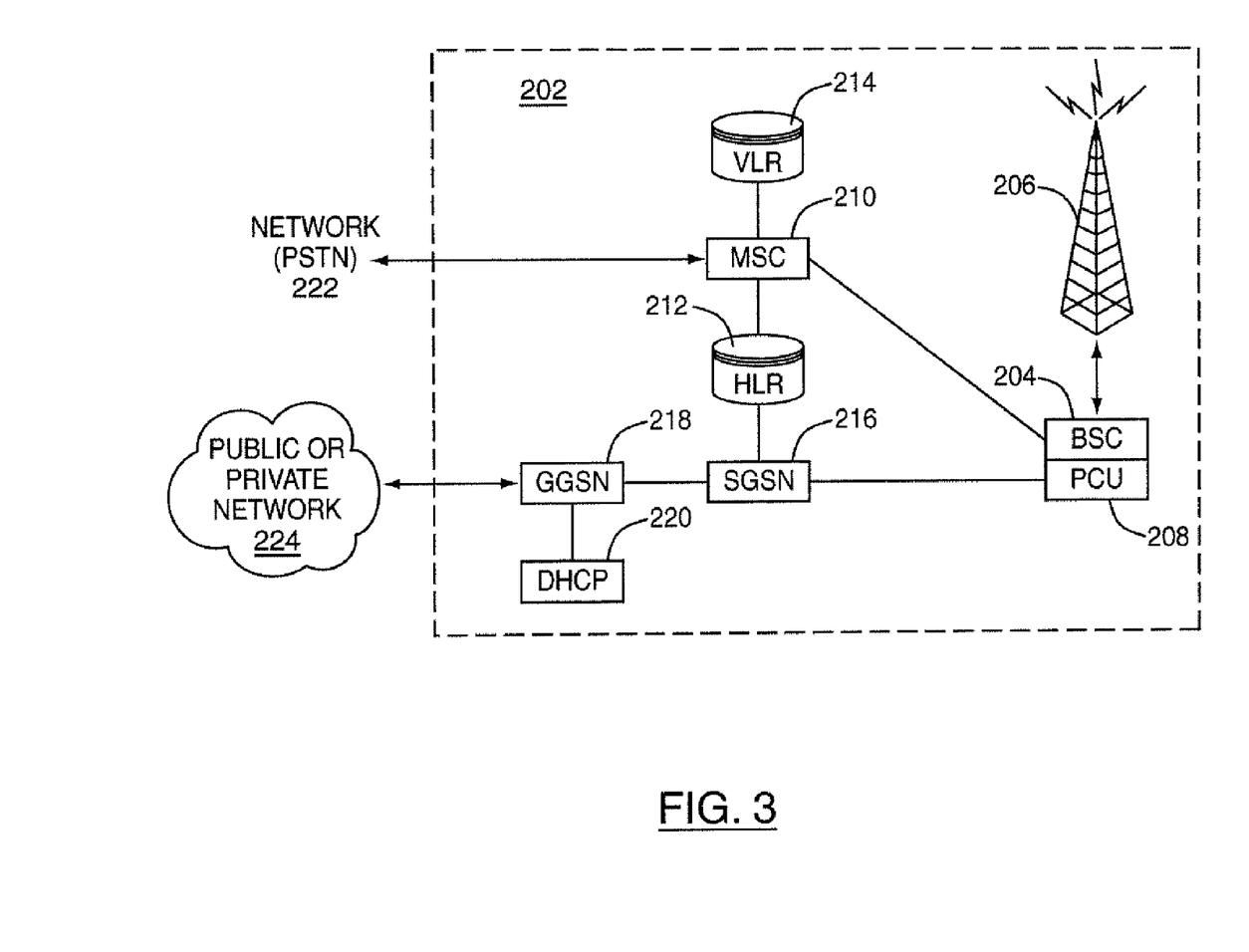
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), Personal Identification Number (PIN) messaging, and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which, assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
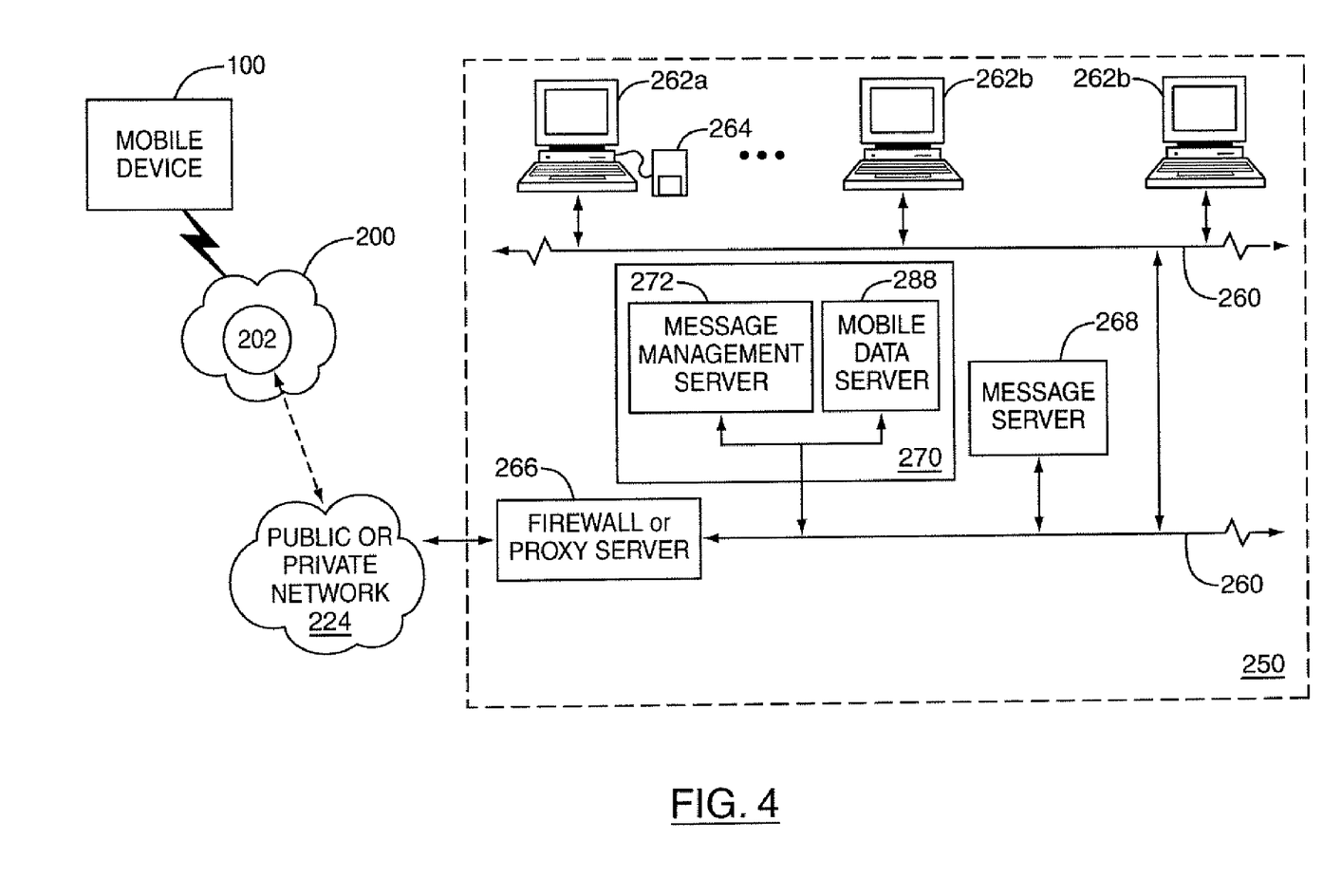
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices needs to be supported.

Message data associated with messages being pushed to mobile device 100 from message management server 272 may be streamed to the mobile device 100, for processing as the data is received at mobile device 100. Whether or not such data is streamed to mobile device 100 may depend on the size or length of messages being pushed to mobile device 100 from message management server 272. Other data, including data originating from shared network infrastructure 224 (e.g. the Internet) for example, may be streamed to mobile device 100 through message management server 272 and/or a mobile data server 288. Such streamed data may contain, for example, video content, audio content, Internet content (e.g. web pages), message (e.g. e-mail, PIN, text, SMS) content, or any other type of data that may be streamed. A server, such as message management server 272 or mobile data server 288 for example, which is capable of transmitting a data stream to a device (e.g. mobile device 100) is referred to herein generally in the specification and in the claims as a data server.

Components other than message management server 272 and mobile data server 288 may function as a data server in variant implementations.

Figure 5:
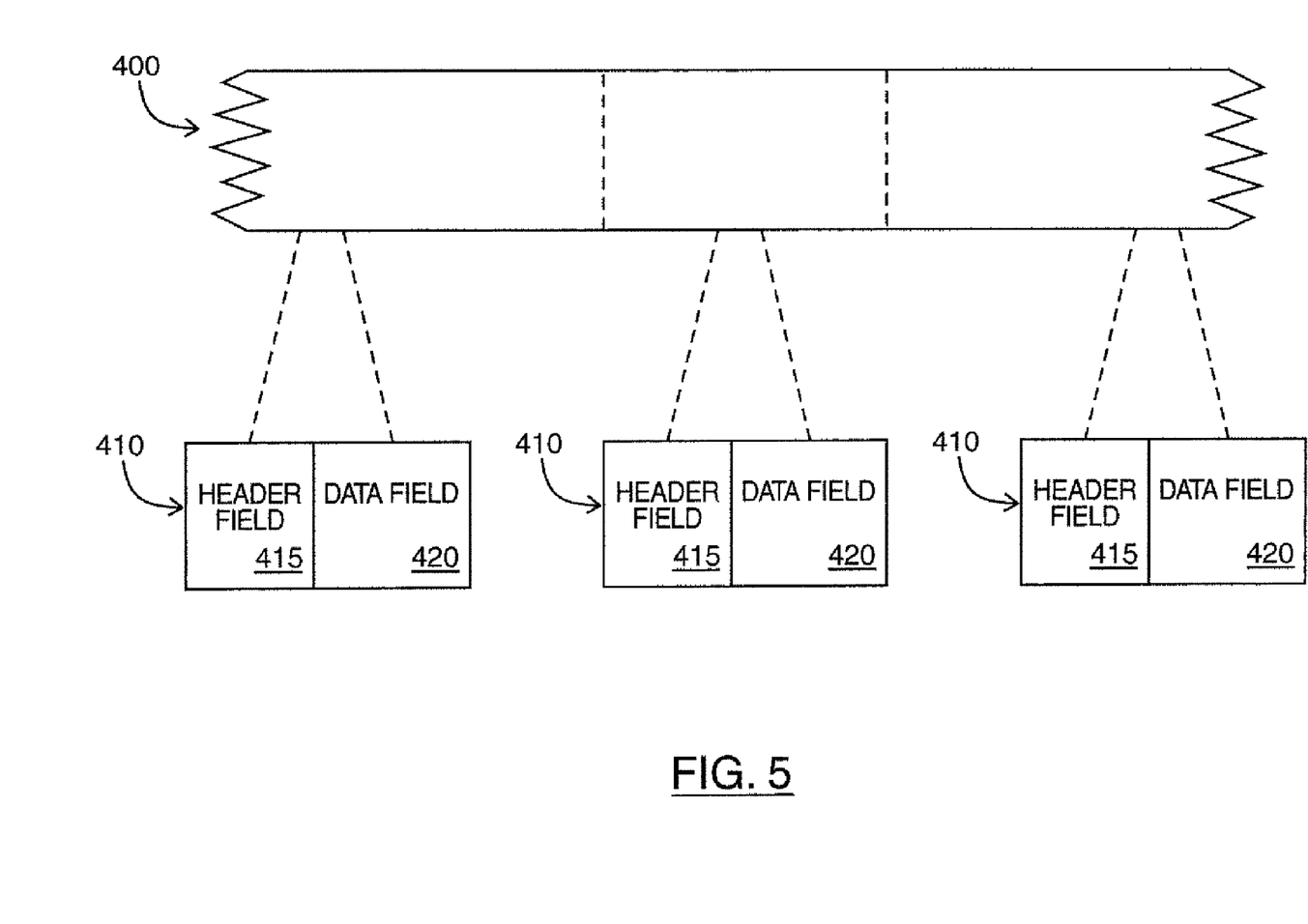
FIG. 5 is a block diagram illustrating packets in an example data stream.

Generally, the data server will stream data to a device such as mobile device 100 in the form of a series of indexed packets. A block diagram of a data stream is shown, by way of example, generally as 400 in FIG. 5. The data stream (typically of a very long length, and potentially infinite) is divided into packets 410 for transmission. Each packet 410 will generally comprise a header 415 appended with the data of the packet 420, with header 415 containing a sequence number that allows a device receiving the data to put packets 410 in the correct order, in the event that packets 410 arrive at the device out of sequence. It will be understood that header 415 may also include other information (e.g. an identifier indicating the end of a data stream). Other techniques for ensuring that the packets can be properly ordered at its destination may be employed, which will typically depend on the specific packet-based communication protocol used to transmit data in packets from the data server to the device.

Due to the nature of mobile device communications and Internet traffic generally (e.g. connectivity issues particular to mobile device communications, restrictions imposed on the amount of data that can be transmitted to a mobile device in a given time or for a particular file or message, etc.), streamed data being received by a mobile device from a data server may be interrupted or cut-off at some point. Furthermore, when a data stream is interrupted, certain packets themselves may be truncated as a result.

For example, when the mobile device requests web information or some other form of streaming data, the data is provided to the device by the data server (e.g. message management server 272 or mobile data server 288). At some point, the data could be truncated for any of a variety of reasons. For instance, the data server may stop sending data due to a quota being exceeded, or the reception of data by the device may be interrupted due to a temporary loss of connection with the wireless network.

Embodiments of the systems and methods described herein are generally directed to a technique that allows data that has been received by the device to be authenticated, without requiring additional overhead to be introduced into the actual data stream, and which can accommodate the reception of truncated packets at the device.

In an exemplary embodiment, in order that the device can authenticate data it has received from the data server, the device sends a request to a data authentication server that identifies where the data stream was interrupted. The data authentication server may be implemented on a computing device that is separate from the data server, or the data server itself may also act as the data authentication server. In either case, the data authentication server is to have access to all the data that was transmitted from the data server to the device. As will be described below, an authentication value can be computed by the data authentication server based on the data that was transmitted from the data server when requested by the device. Subsequent access to the data is necessary as authentication information is not released into the data stream at the time of transmission, and accordingly, the data still needs to be available after the data is transmitted.

In one embodiment, the data server may have saved a copy of the data that it has transmitted to the device in a streamed data store that is accessible to the data authentication server.

In one embodiment, the data authentication server can compute an authentication value based on all of the data transmitted to the device up to the point where the data stream is interrupted, typically in respect of a particular file or message. This authentication value computed by the data authentication server can be returned to the device. The device is adapted to calculate its own authentication value based on all of the data it has received up to the same point. These two authentication values can then be compared to determine if the device has an authentic copy of the data received up to that point.

Other features of the foregoing embodiments and of other embodiments will be described with reference to FIG. 6.

Figure 6:
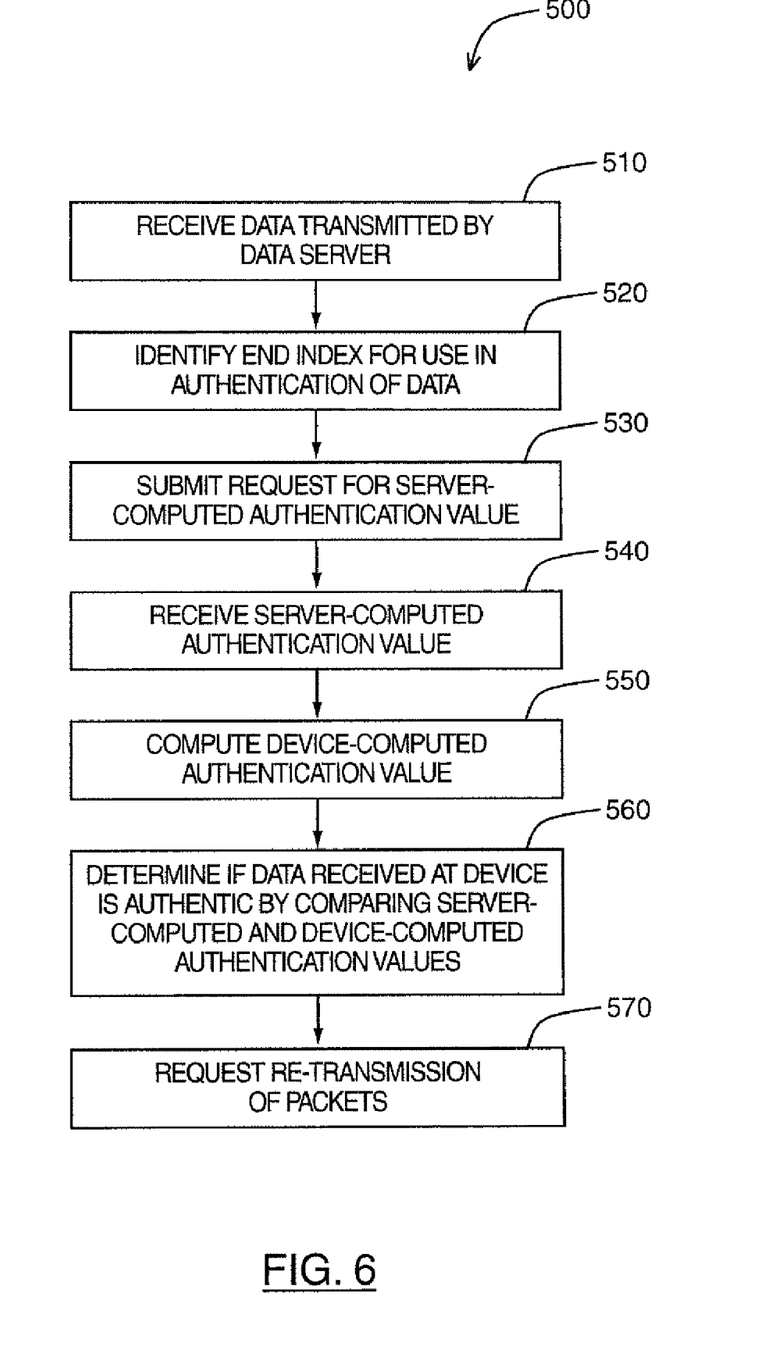
FIG. 6 is a flowchart illustrating steps in a method of authenticating streamed data to a device in accordance with a number of exemplary embodiments.

Referring now to FIG. 6, a flowchart illustrating the steps of a method of authenticating streamed data with respect to a number of exemplary embodiments is shown generally as 500.

In authentication method 500 as shown in FIG. 6, the authenticity of data streamed from a data server to a device is verified. The data server may be a message management server (e.g. 272 of FIG. 4), a mobile data server (e.g. 288 of FIG. 4), or other component adapted to communicate with the device. The data server is adapted to transmit data streamed as indexed data packets to the device. The device may be a mobile device (e.g. mobile device 100 of FIG. 1), and due to the nature of mobile device communications, embodiments of method 500 may be particularly useful in mobile device applications. However, the device may be some other computing device in variant embodiments.

Various types of data may be streamed between the data server and the device, including video, audio or web content, for example, or any other type of streaming data.

At step 510, data transmitted from the data server is received by the device. The data transmitted from the data server to the device may or may not be encrypted, and may or may not be communicated over a secure communications channel. Typically, the data being transmitted is associated with a file or message that a user of the device has requested, and the device communicates with the data server in order to retrieve this file or message. The file or message need not be of a fixed or finite size, and will typically have some type of identifier (e.g. a filename, message ID) associated with it so that it can be identified.

The file or message may originate from a local store (e.g. on LAN 250 of FIG. 4) or from a remote source (e.g. via the Internet or other shared network infrastructure 224 of FIG. 4), for example, before it is relayed by the data server to the device. The data for this file or message is transmitted by the data server as a plurality of streamed data packets (e.g. packets 410 of FIG. 5) and received by the device, with the data being indexed in accordance with the packet communication protocol being employed.

The packets may be transmitted from the data server and received by the device over the Internet or other network, or over any other suitable communication channel that has been established between the data server and the device.

In one embodiment of a system for authenticating streamed data, a copy of the data transmitted by the data server is saved in a streamed data store [not explicitly shown], either on the data server or on some other storage device coupled to the data server. Data saved in the streamed data store provides a record of the data that was transmitted by the data server and ought to have been received by the device. If the data has not been corrupted or otherwise modified during transit, the device should receive the data as was transmitted to it by the data server.

In a variant embodiment, the data server may employ a method of tracking what data has been transmitted to the device without storing a copy of the data in a streamed data store. In this case, the data server would be able to access and retrieve data, as needed, from its original source.

At step 520, optionally, an end index associated with a packet is identified at the device. The end index is used to define the end point of the data that the device wishes to verify the authenticity of.

For example, if the stream of data being received from the data server at step 510 is cut-off or interrupted for some reason, then after this condition is detected, the device may wish to verify that the data that was received prior to the stream being interrupted is authentic. In one embodiment, at step 520, the device will determine the last non-truncated packet of data received at this device, and identify the end index associated with this packet accordingly. When a data stream is interrupted, it is possible that a packet in the process of being received by the device will be truncated. In that case, the last non-truncated packet would be the packet preceding the truncated packet in the sequence of packets in the data stream. The last non-truncated packet may also be the last packet of the data stream, if all the data that has been transmitted by the data server for the specific file or message has been received by the device.

The last non-truncated packet may also be a packet in an interrupted sequence of packets, if the last packet received by the device before the interruption was received in its entirety. In each of these cases, the end index is generally used to denote the point in a data stream, the data before which is to be verified by the device for authenticity.

The device may employ various techniques to determine whether or not an interruption of the transmission of the stream of data from the data server has occurred. For example, a time-out mechanism may be employed, in which a packet must be received within a pre-determined time threshold. If a packet is not received within the requisite time period, then an interruption will be deemed to occur. In some implementations, the detection of a lost packet (e.g. failure to receive a specific packet in a sequence of packets within a certain time period) may also be deemed to be an interruption of the data stream.

At step 530, a request for a server-computed authentication value is submitted to a data authentication server. This may be triggered by an interruption of the data stream as detected at the device, or the completion of a file or message download to the device, for example.

In variant embodiments, step 530 may be triggered after a certain pre-defined number of packets have been received by the device at step 510, after a certain pre-defined time interval, or upon the occurrence of some other pre-defined event, for example.

As suggested earlier in the description, in one embodiment of a system for authenticating streamed data, the data server and the data authentication server may be the same device. For example, the message management server (e.g. 272 of FIG. 4) and/or the mobile data server (e.g. 288 of FIG. 4) may be adapted to transmit streamed data to the device (e.g. mobile device 100 of FIG. 1) and also to accept requests from that device for server-computed authentication values, thereby acting as both the data server and the data authentication server described in method 500.

In variant embodiments, the functions of the data server and the data authentication server may be provided by separate devices. In the latter case, and where data is saved in a streamed data store by the data server, the streamed data store is made accessible to the separate data authentication server.

The server-computed authentication value is generated by a data authentication server, and comprises data that can be used to assist the device in authenticating the data that it has received from the data server. In accordance with an embodiment of a system for authenticating streamed data, an application executing on the data authentication server is programmed to compute the server-computed authentication value by applying an authentication value generating function to data that was transmitted to the device. A copy of the data that was transmitted to the device may first be retrieved from a streamed data store, for example, in order to compute this value.

The authentication value generating function operates on specific data to generate an authentication value that is preferably, substantially unique to that specific data. For example, the authentication value generating function may be a one-way hash function. Generally, a hash function transforms data into a value of a fixed length that represents the original data, a value that is generally referred to as a hash value. Ideally, the hash function employed is constructed so that two sets of data will not generate the same hash value. Examples of known hash functions include MD2, MD5, and SHA-1. Other authentication value generating functions may be employed in variant embodiments.

In an embodiment of method 500 described above, the request submitted to the data authentication server comprises an end index identified at step 520. It will be understood that the request will generally comprise other information, such as an identifier of the specific file or message transmitted as a data stream to the device. The end index is used to define specific data of the data stream, which the authentication value generating function is to operate on. For instance, if the end index defines the last non-truncated packet of the packets received by the device at step 510, then the data authentication server may compute the server-computed authentication value based on all of the data transmitted by the data server to the device (e.g. as stored in the streamed data store) up to the packet associated with the end index.

In general, the server-computed authentication value is computed by the data authentication server based on a subset of the data transmitted by the data server associated with the identified file or message. In the above-mentioned embodiment, this subset is defined by the end index. However, in variant embodiments, an end index need not be explicitly identified. For example, where the device will only require authentication of data after it receives an entire file or message from a data server, then the data authentication server may be configured to always compute the server-computed authentication value based on the data associated with the entire file or message in the absence of an explicitly identified end index.

As in some cases, the server-computed authentication value requested by the device will be based on all of the packets of data transmitted by the data server (e.g. in a completed file or message download), it is intended that the term "subset" of certain specified data as used in the specification and in the claims be interpreted broadly, and in particular, "subset" may denote the entire set of such specified data in respect of those cases.

In the above-mentioned examples, the first packet in the subset of data on which the server-computed authentication value is based was implicitly defined as the first packet of the data stream of the associated file or message. However, in variant embodiments, the first packet in the subset of data may be a specific packet subsequent to the first packet, if desired.

In variant embodiments of method 500, a start index may be explicitly identified and included in the request submitted at step 530. The start index may be employed alone or in combination with an end index, to define the subset of the data on which the server-computed authentication value is to be based in these variant embodiments.

As noted above, the data authentication server is adapted to compute a server-computed authentication value based on a subset of data transmitted by the data server to the device. It may be desirable to protect this server-computed authentication value from tampering. Transmitting the server-computed authentication value without subjecting it to a technique for guaranteeing its integrity between the data authentication server and the device may be subject to attack. This may be of particular concern if the channel of communication between the data authentication server and the device is insecure.

Accordingly, in one embodiment, the data authentication server is further adapted to digitally sign the server-computed authentication values that it computes, with a private key. The private key may be one that is used by the data authentication server for multiple purposes, or it may be one that is used specifically to sign server-computed authentication values, for example. As with known digital signing techniques, the digital signature that is generated can only be properly verified using the corresponding public key. In the embodiments of the systems described herein, the corresponding public key is made available to devices that are to communicate with the data authentication server. For example, the corresponding public key may be pre-loaded to mobile device 100 through a cradle (e.g. 264 of FIG. 4) attached to a user computer (e.g. 262*a* of FIG. 4). In this way, a device that receives a server-computed authentication value from the data authentication server can verify that it was sent from the data authentication server, and also that the value was not modified in transit.

Alternatively, in another embodiment, the data authentication server is adapted to generate a message authentication code (MAC) for the server-computed authentication values that it computes, in accordance with a MAC algorithm. A MAC algorithm can be generated in various ways, however, the data authentication server and the device will generally be required to have a shared secret key. One example of a MAC that may be generated is a hashed MAC (HMAC), in known manner. In embodiments of the systems described herein, the shared secret key is made available to devices that are to communicate with the data authentication server. For example, the shared secret key may be pre-loaded to mobile device 100 through a cradle (e.g. 264 of FIG. 4) attached to a user computer (e.g. 262*a* of FIG. 4). In this way, the device which receives a server-computed authentication value from the data authentication server can verify that the value was not modified in transit.

At step 540, the server-computed authentication value, requested at step 530 and subsequently computed and transmitted by the data authentication server, is received at the device. As noted above, in some embodiments, the server-computed authentication value may be accompanied by a digital signature or a MAC.

At step 550, a device-computed authentication value is computed at the device. It will be understood that it is not necessary that the server-computed authentication value be requested from the data authentication server nor is it necessary that the device receive the data authentication server before the device-computed authentication value is computed at the device.

The device-computed authentication value is computed based on a subset of the data received at the device at step 510 that corresponds to the subset of the data transmitted by the data server on which the server-computed authentication value computed (or to be computed) by the data authentication server and received (or to be received) at the device at step 540 is based.

In accordance with an embodiment of a system for authenticating streamed data, an application executing on the device is programmed to compute the device-computed authentication value by applying the same authentication value generating function that was applied to the transmitted data used to compute the server-computed authentication value, to the corresponding data received at the device. This is done so that when a particular series of packets is transmitted from the data server to the device, if the device receives those packets as they were transmitted (i.e. the series of packets is not corrupted or modified), then the same authentication value generating function (e.g. hash function) when applied to the data on both the server-side sequence of packets (i.e. the packets as transmitted) and the device-side sequence of packets (i.e. the packets as received) should generate matching authentication values.

It will be understood that the data that corresponds to the data used to generate the server-computed authentication value must be used to generate the device-computed authentication value, in order to produce the proper result. Similar to the way in which the server-computed authentication value is calculated, the particular subset of data upon which the device-computed authentication value is to be based may be correspondingly defined by an end index (e.g. marking the point where the last non-truncated packet in the data stream) and/or possibly a start index, or by no indices, depending on the particular embodiment.

At step 560, the device-computed authentication value computed at step 550 is compared to the server-computed authentication value computed by the data authentication server and received at step 540, to determine if the data received by the device on which the device-computed authentication value is based is authentic. If the device-computed and server-computed authentication values match, then this suggests that the data transmitted by the data server (on which the server-computed authentication value is based) is the same as the data received by the device (on which the device-computed authentication value is based).

If the server-computed authentication value has also been digitally signed by the data authentication server, then the accompanying digital signature would be verified at step 560. If the digital signature successfully verifies, then this would also suggest to the device that the server-computed authentication value did originate from the data authentication server and was not modified in transit.

Similarly, if a MAC (e.g. HMAC) accompanied the server-computed authentication value received by the device, the MAC is verified at step 560. If the verification is successful, then this would suggest that the server-computed authentication value was not modified in transport. Assuming that only the data authentication server and the device have access to the shared secret key, the device can also be reasonably certain (since, technically, the device itself can also generate the MAC, not only the data authentication server) that the server-computed authentication value did originate from the data authentication server.

In the embodiments of the systems and methods described herein, authentication method 500 does not require any extra authentication information to be distributed over the packets of data that are transmitted from the data server to the device. Instead, a data authentication server, (which may be the same computing device as the data server in at least one embodiment), is queried by the device after the fact to obtain authentication information. As a result, the overhead associated with packet transmission is typically reduced, and less bandwidth used for packet transmission. This may be particularly beneficial where the device is a mobile device.

Optionally, at step 570, the device may submit a request to the data server to re-transmit certain data packets that it may not have received, or that may have been truncated. For example, if the data stream to a mobile device was interrupted due to a loss of connection to the wireless network, this step may be performed once a connection to the wireless network is re-established. The request may include identification of the specific packet(s) to be re-sent, or of the first packet in the remaining packets of the data stream, which were never received completely at the device, for example.

The specific actions to be performed at the device if the data being authenticated is determined not to be authentic may differ depending on the particular implementation. For example, data determined not to be authentic may be discarded and a request for the data to be re-transmitted may be made. Other responses to a determination that certain data is not authentic are possible in variant implementations.

The steps of embodiments of the method of authenticating streamed data may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A device for authenticating data, the device comprising a processor and a memory, the memory storing a plurality of instructions that, when executed by the processor, configure the processor to:
   receive data in a plurality of indexed packets transmitted by a data server, the data of the indexed packets being at least a portion of a larger data stream that is processed as the data is received at the device; wherein authentication data for the data stream is absent from the plurality of indexed packets;
   submit a request for a server-computed authentication value, to a data authentication server, over a network, wherein if the data stream is interrupted, the request submitted by the device identifies a point in the data stream where the data stream is interrupted, and wherein the data authentication server has access to the data that was transmitted from the data server to the device and computes the server-computed authentication value based on a subset of the data transmitted by the data server up to the point where the data stream is interrupted;
   receive, from the data authentication server, the server-computed authentication value; and
   compare a device-computed authentication value, based on a subset of the received data corresponding to the subset of the data transmitted by the data server, with the server-computed authentication value in order to determine whether the subset of the data received at the device is authentic.

2. The device of claim 1, wherein the server-computed authentication value and the device-computed authentication value are each computed by applying a same generating function to the subset of the data transmitted by the data server and to the subset of the received data corresponding to the subset of the data transmitted by the data server, respectively.

3. The device of claim 2, wherein the generating function comprises a hash function.

4. The device of claim 1, wherein the processor is further configured to identify an end index, wherein the request comprises the end index, and wherein the end index defines both the subset of the data, transmitted by the data server, on which the server-computed authentication value is based and the subset of the data, received by the device, on which the device-computed authentication value is based.

5. The device of claim 4, wherein the end index is associated with a last non-truncated packet of data received at the device.

6. The device of claim 1, wherein the processor is further configured to submit a request to the data server to re-transmit data of at least one of the plurality of indexed packets.

7. The device of claim 1, wherein the processor is further configured to identify a start index, wherein the request further comprises the start index, and wherein the start index defines both the subset of the data, transmitted by the data server, on which the server-computed authentication value is based and the subset of the data, received by the device, on which the device-computed authentication value is based.

8. The device of claim 1, wherein the subset of the data, transmitted by the data server, on which the server-computed authentication value is based includes all of the packets in the plurality of indexed packets transmitted by the data server.

9. The device of claim 1, wherein the processor is further configured to verify a signature, generated by the data authentication server, of the server-computed authentication value.

10. The device of claim 1, wherein the processor is further configured to receive a message authentication code, generated by the data authentication server, for the server-computed authentication value received at the device and to verify the message authentication code.

11. The device of claim 1, wherein the device comprises a mobile device.

12. The device of claim 1, wherein the data server stores a copy of data transmitted by the data server in a streamed data store accessible to the data authentication server.

13. The device of claim 1, wherein the data server and the data authentication server are the same computing device.

14. A method of authenticating data, the method comprising:
   receiving, at a device, data in a plurality of indexed packets transmitted by a data server, the data of the indexed packets being at least a portion of a larger data stream that is processed as the data is received at the device; wherein authentication data for the data stream is absent from the plurality of indexed packets;
   submitting a request for a server-computed authentication value, to a data authentication server, over a network, wherein if the data stream is interrupted, the request submitted by the device identifies a point in the data stream where the data stream was interrupted, and wherein the data authentication server has access to the data that was transmitted from the data server to the device and computes the server-computed authentication value based on a subset of the data transmitted by the data server up to the point where the data stream is interrupted;
   receiving, at the device, from the data authentication server, the server-computed authentication value; and
   comparing a device-computed authentication value, based on a subset of the received data corresponding to the subset of the data transmitted by the data server, with the server-computed authentication value in order to determine whether the subset of the data received at the device is authentic.

15. The method of claim 14, wherein the server-computed authentication value and the device-computed authentication value are each computed by applying a same generating function to the subset of the data transmitted by the data server and to the subset of the received data corresponding to the subset of the data transmitted by the data server, respectively.

16. The method of claim 15, wherein the generating function comprises a hash function.

17. The method of claim 14, further comprising identifying an end index, wherein the request comprises the end index, and wherein the end index defines both the subset of the data, transmitted by the data server, on which the server-computed authentication value is based and the subset of the data, received by the device, on which the device-computed authentication value is based.

18. The method of claim 17, wherein the end index is associated with a last non-truncated packet of data received at the device.

19. The method of claim 14, further comprising submitting a request to the data server to re-transmit data of at least one of the plurality of indexed packets.

20. The method of claim 14, further comprising identifying a start index, wherein the request further comprises the start index, and wherein the start index defines both the subset of the data, transmitted by the data server, on which the server-computed authentication value is based and the subset of the data, received by the device, on which the device-computed authentication value is based.

21. The method of claim 14, wherein the subset of the data, transmitted by the data server, on which the server-computed authentication value is based includes all of the packets in the plurality of indexed packets transmitted by the data server.

22. The method of claim 14, wherein the method further comprises verifying a signature, generated by the data authentication server, of the server-computed authentication value.

23. The method of claim 14, wherein the method further comprises receiving a message authentication code, generated by the data authentication server, for the server-computed authentication value received at the device; and verifying the message authentication code.

24. The method of claim 14, wherein the device comprises a mobile device.

25. The method of claim 14, wherein the data server stores a copy of data transmitted by the data server in a streamed data store accessible to the data authentication server.

26. The method of claim 14, wherein the data server and the data authentication server are the same computing device.

27. A non-transitory computer-readable storage medium upon which a plurality of instructions executable by a processor is stored, the instructions for performing a method of authenticating data, the method comprising:
receiving, at a device, data in a plurality of indexed packets transmitted by a data server, the data of the indexed packets being at least a portion of a larger data stream that is processed as the data is received at the device;
wherein authentication data for the data stream is absent from the plurality of indexed packets;
submitting a request for a server-computed authentication value, to a data authentication server, over a network, wherein if the data stream is interrupted, the request submitted by the device identifies a point in the data stream where the data stream is interrupted, and wherein the data authentication server has access to the data that was transmitted from the data server to the device and computes the server-computed authentication value based on a subset of the data transmitted by the data server up to the point where the data stream is interrupted;
receiving, at the device, from the data authentication server, the server-computed authentication value; and
comparing a device-computed authentication value based on a subset of the received data corresponding to the subset of the data transmitted by the data server, with the server-computed authentication value in order to determine whether the subset of the data received at the device is authentic.

* * * * *